Aug. 26, 1969  M. W. WATERMAN  3,464,041
ELECTRICAL TRANSFORMER HAVING LEAKAGE FLUX SHIELD
Filed March 6, 1968  2 Sheets-Sheet 1

Inventor
Michael W. Waterman
By Lee H. Kaiser
Attorney

Aug. 26, 1969 M. W. WATERMAN 3,464,041
ELECTRICAL TRANSFORMER HAVING LEAKAGE FLUX SHIELD
Filed March 6, 1968 2 Sheets-Sheet 2
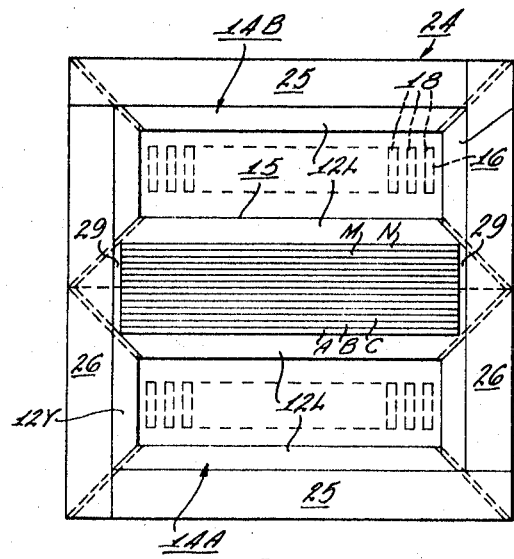
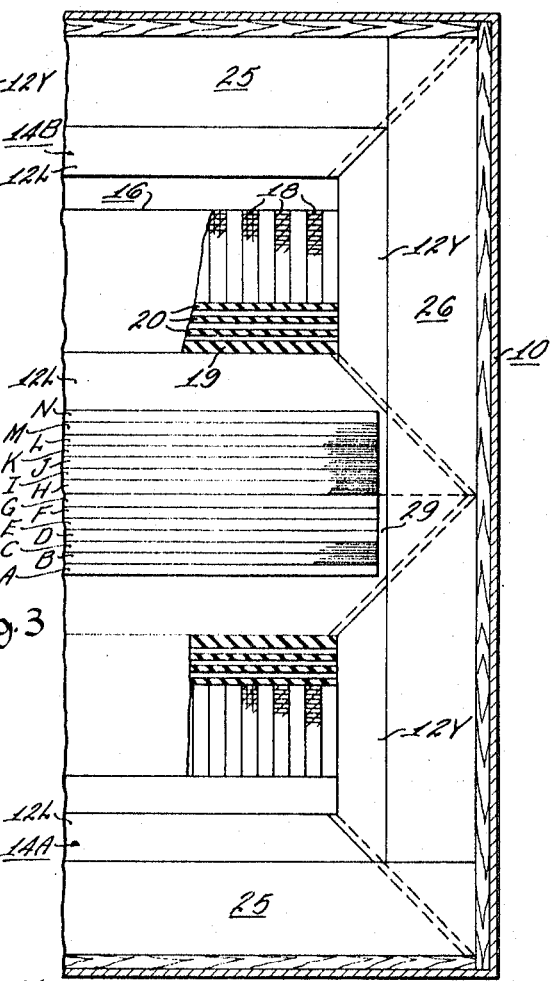
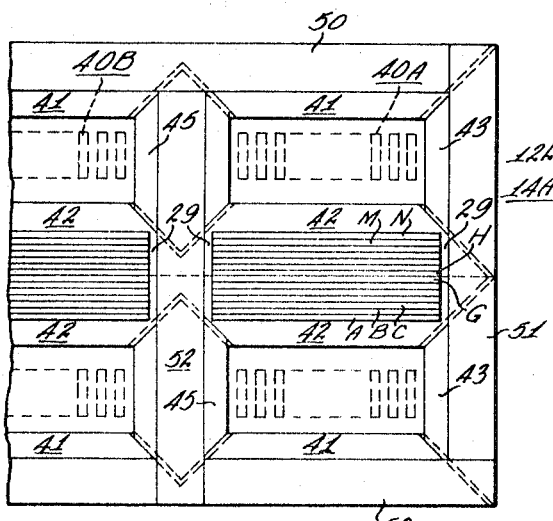
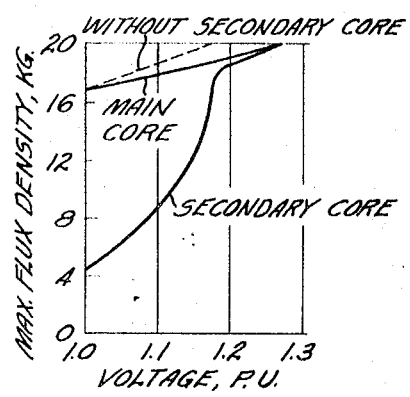
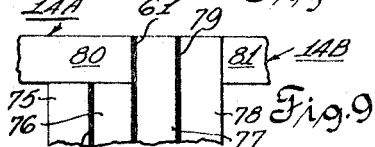
Inventor
Michael W. Waterman
By Lee W. Kaiser
Attorneys United States Patent Office  3,464,041
Patented Aug. 26, 1969

3,464,041
ELECTRICAL TRANSFORMER HAVING LEAKAGE FLUX SHIELD
Michael W. Waterman, Milwaukee, Wis., assignor to Allis-Chalmers Manufacturing Company, Milwaukee, Wis.
Filed Mar. 6, 1968, Ser. No. 710,815
Int. Cl. H01f 33/00, 15/04, 17/06
U.S. Cl. 336—5                                     20 Claims

ABSTRACT OF THE DISCLOSURE

A shell type transformer has closed leakage flux shielding, secondary magnetic cores disposed between the tongue of the main magnetic core and the inner periphery of the coil to prevent excessive eddy current heating of the main core laminations caused by leakage flux. Each secondary core has a plurality of side-by-side core packs of narrow laminations disposed in vertical planes extending beyond the ends of the coil and spaced by an air gap from yoke portions of the secondary core positioned adjacent the axial ends of the coil. The core pack laminations carry leakage flux and only minimal main flux at normal excitation levels but carry a substantial portion of the main flux at overvoltages so that the saturation level of the main magnetic core is increased.

---

This invention relates to stationary induction apparatus and in particular to electrical power transformers having leakage flux shielding means.

Magnetic shields on the tongue wedge and on the T-shaped coil support within the coil window of a shell type transformer are disclosed in such prior art U.S. patents as 2,370,045 to Keto and 3,281,745 to Moore et al. to conduct the lines of stray flux and prevent eddy current overheating of these members. Such magnetic shields comprise bundles of magnetic laminations termed "core packs" which cause the stray flux to pass through the laminated shield and prevent the stray flux from entering the tongue wedge and T-shaped core support.

Overheating of the laminations in the tongue portion of the magnetic core of a shell type transformer may occur as a result of leakage flux entering the laminations at right angles to the plane of the laminations and generating eddy currents which produce I²R losses. In larger shell form units, such as those above 200 mva., the leakage flux density may be sufficiently high to produce excessive eddy currents in laminations and clamping members having a surface normal to the leakage flux wider than approximately 0.5 inch. Such eddy currents may generate sufficient heat to cause the electrical insulation of the transformer to become thermally unstable and fail electrically.

It is an object of the invention to provide an electrical transformer having reduced temperature rise caused by eddy current overheating resulting from leakage flux.

It is a further object of the invention to provide an electrical transformer having improved magnetic shielding means which minimizes penetration of leakage flux into the laminations of the main core. A still further object is to provide such a transformer having an improved magnetic shield which substantially increases the maximum excitation level which the transformer can withstand without failure.

Another object of the invention is to provide an electrical transformer having improved magnetic shielding means which carries minimal main flux at normal excitation levels but carries a substantial portion of the main flux at overvoltages so that the saturation level of the magnetic core is increased.

Figure 1:
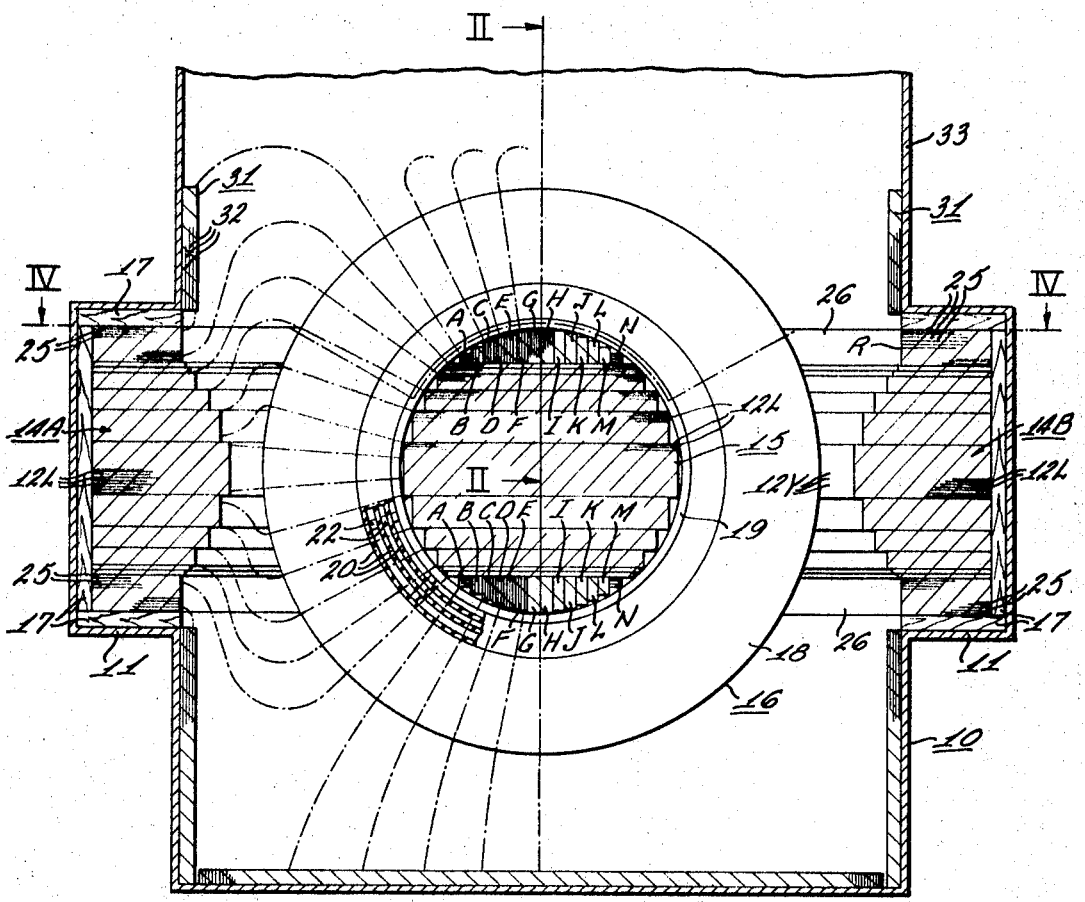
Figure 2:
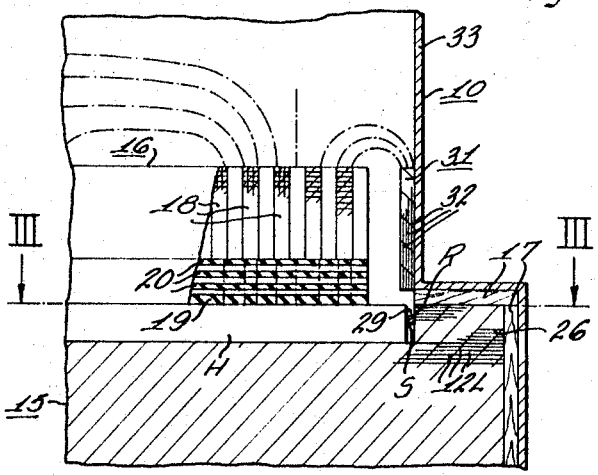
Figure 7:
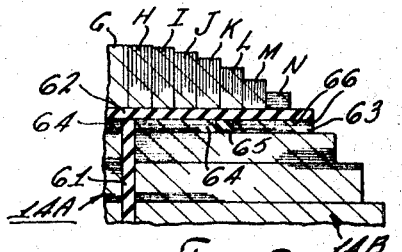
Figure 8:
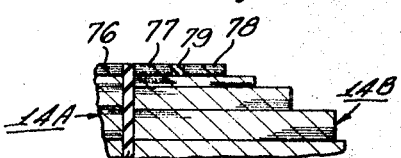

These and other objects and advantages of the invention will be more readily apparent from the following detailed description when considered in conjunction with the accompanying drawing wherein:

FIG. 1 is a cross sectional view through a shell type transformer embodying the invention;
FIG. 2 is a view taken along line II—II of FIG. 1;
FIG. 3 is a view taken along line III—III of FIG. 2;
FIG. 4 is a view taken along line IV—IV of FIG. 1, on a reduced scale, showing the magnetic core of a single phase transformer embodying the invention, the coils being shown schematically in dotted lines;
FIG. 5 is a view similar to FIG. 4 through a three phase transformer embodiment of the invention;
FIG. 6 is a graph plotting maximum flux density in the magnetic core of the transformer embodying the invention as ordinates versus percent rated voltage as abscissa;
FIG. 7 is a partial sectional view through the tongue of the main core and the leakage flux shield of an alternative embodiment of the invention;
FIG. 8 is a partial cross sectional view through the tongue of a magnetic core wherein the laminations in the narrowest step prevent excessive overheating of the core as a result of eddy currents induced by leakage flux; and
FIGS. 9 and 10 are partial plan views of alternate lamination layers at the junction between the tongue and yoke portions of the core of FIG. 8.

Referring to the drawing, a circular coil, shell type transformer is illustrated enclosed in a metallic tank 10 having a shelf portion 11 around its entire periphery which supports the magnetic steel laminations 12L of the magnetic core legs and also the laminations 12Y of the magnetic core yokes. The invention will be described as embodied in a single phase transformer having a magnetic core arrangement such as shown in FIG. 4, but it will be appreciated that the invention may also be incorporated in a three phase transformer having a magnetic core arrangement such as illustrated in FIG. 5. The laminated main magnetic core is of the well known shell type and preferably has two back-to-back rectangular loops 14A and 14B, and each horizontal layer of each loop 14A and 14B preferably comprises a pair of yoke laminations 12Y having mitered ends abutting against the mitered ends of a pair of leg laminations 12L. The back-to-back leg laminations 12L of the two loops 14A and 14B form the iron tongue 15 of the core which is surrounded by the cylindrical electrical coil 16 of the transformer. Preferably the leg laminations 12L are of different widths, and the back-to-back loops 14A and 14B form a tongue 15 of cruciform cross section which passes through the window of coil 16. Insulating members 17 of suitable material such as maple wood may be disposed between the wall portions of tank 10 and the magnetic core laminations 12L and 12Y.

Coil 16 preferably comprises a plurality of axially spaced apart pancake windings 18 certain of which are high voltage windings and others of which are low voltage windings. The primary winding of the transformer may comprise a plurality of high voltage pancake windings 18 adjacent the center of the coil stack, and the secondary winding of the transformer may comprise groups of low voltage pancake windings 18 on opposite ends of the stack in well known manner. Annular insulating spacers (not shown) may be provided between adjacent pancake windings 18, and high-to-low insulating barriers (not shown) may be disposed between the primary and secondary windings in a manner well known in the art. The pancake coils 18 may be supported on a center foundation tube 19 of suitable material such as phenolic insulation having a dielectric constant approximately equal to oil-impregnated kraft paper. A plurality of telescoped inside insulation cylinders 20 may surround tube 19 and be disposed between tube 19 and the pancake windings 18. Each inside insulation cylinder 20 may be of kraft paper wound into a tube and having spacer sticks 22 secured thereto which extend parallel to the coil axis and are spaced apart circumferentially to provide cooling ducts axially of the coil for the transformer oil (not shown) within tank 10 in which the core and coil assembly is immersed.

The structure described hereinbefore is known in the art. The magnetic shield in accordance with the invention preferably comprises a secondary magnetic core which normally carries the leakage flux but which will, in the event of overexcitation of the transformer, carry a portion of the main exciting flux. The secondary magnetic core illustrated in the drawing includes fourteen core packs, or bundles A through N of magnetic steel laminations disposed within the coil window adjacent the top surface of the main core and an equal number of bundles A-N disposed within the coil window adjacent the bottom surface of the main core. The packs are in a horizontal plane and progressively increase in height from the outer to the center packs to conform to the circular opening in foundation tube 19. The laminations of bundles B through M are illustrated as being in vertical planes so that they are approximately parallel to the leakage flux lines (illustrated by the lines of magnetic flux intensity shown in FIGS. 1 and 2) which enter at the edges of the lamination rather than perpendicular to the plane thereof. It will be appreciated that this construction substantially reduces the eddy current $I^2R$ heating generated by leakage flux in comparison to a transformer wherein the flux enters perpendicular to the laminations. The leakage flux enters the outer packs A and N at a greater angle to the plane thereof than the packs B through M, and the packs A and N are illustrated as having laminations in horizontal planes parallel to the main core laminations 12L and 12Y. Any desired combination of laminations in horizontal and vertical planes may be utilized in the secondary core tongue, and the height and width and plane of the secondary core laminations in the core packs are selected so that minimum leakage flux penetrates into the main core tongue laminations 12L and eddy current heating does not result in sufficient temperature rise to deteriorate the insulation even when the transformer is carrying twice rated current.

The core packs in vertical planes B through M carry all of the leakage flux generated in their sector of the inner periphery until the transformer current reaches such magnitude as will cause the packs to become saturated. Additional leakage flux generated by transformer currents of greater magnitude will then penetrate to the main core laminations. The cross sectional area of packs B through M is chosen so that this additional leakage flux, if it does exist, will not be of sufficient density to cause excessive eddy ecurrent heating in the main core laminations. Eddy current heating is minimal in the vertical laminations in core packs B-M even when they are saturated since only their edges are normal to the leakage flux. The temperature rise limits for eddy current heating are approximately 80 degrees centigrade when rated current is flowing in the transformer and 150 degrees centigrade with twice rated current.

Areas near the extreme edges of the secondary core, typically in the vicinity of packs A and N, do not contain sufficient cross sectional area to carry a large quantity of leakage flux as do the larger packs B through M. The design concept is therefore modified so that the secondary core protective characteristic is maintained in these areas.

Because the leakage flux enters packs A and N at a large angle with respect to the lamination surface, approximately 30 degrees to 60 degrees, substantial eddy currents will be generated in the laminations. The eddy currents produce a counter magnetomotive force which tends to repel the leakage flux in that area. The width of the laminations of packs A and N and their orientation in a vertical or horizontal plane is chosen so that the eddy currents which flow will be of sufficient magnitude to substantially repel the leakage flux but will not be of great enough magnitude to cause excessive eddy current heating.

Sheet insulation having insulating blocks mounted thereon in spaced relation to define oil circulating ducts are provided in vertical planes between the two back-to-back loops 14A and 14B and also between the narrowest step of main core laminations 12L and the core packs A-N, but such insulation does not constitute part of the invention and is eliminated from the drawing in order to simplify the construction and to facilitate the understanding of the invention.

The secondary core magnetic shield of the invention forms a pair of iron loops at the upper surface of the main core and a similar pair of iron loops at the lower surface of the main core through which the leakage flux carried by the core packs A-N can return. The core packs A-N constitute the tongue portion of such secondary core iron loops, and preferably an air gap is provided in each loop. The secondary core loops at the upper and lower surfaces of the main core are identical, and only those at the upper surface will be described.

In the embodiment illustrated in the drawing, the core packs A-N at the upper surface of the main core extend beyond the axial ends of the coil 16, as best seen in FIG. 2, and define portions of a pair of closed rectangular secondary cores 24 (see FIG. 4) formed of laminations of magnetic material surrounding coil 16 and having opposed leg portions defined by secondary core leg laminations 25 connected by opposed yoke portions formed by secondary core yoke laminations 26 and separated by air gaps 29 from the ends of the core packs A-N. The secondary core leg laminations 25 are narrower than and disposed above the outer leg laminations 12L of the two main core loops 14A and 14B. The secondary core yoke laminations 26 are narrower than the yoke laminations 12Y of the main core and are disposed above the leg laminations 12Y of both loops 14A and 14B and have straight line butt joints with the secondary core leg laminations 25. This construction facilitates adjustment of the air gap 29 between the ends of the laminations of the core packs A-N and the secondary core yoke laminations 26 to the desired spacing, which preferably is within the range of from 0.040 to 0.10 inch.

The leakage flux within the coil 16 emerges therefrom in radial lines adjacent the inner and outer periphery as shown schematically in FIGS. 1 and 2. The radial leakage flux lines at the inner coil periphery primarily pass into the laminations of the bundles B through M which are generally parallel to the leakage flux lines so that the flux enters the edge of each lamination and is substantially prevented from penetrating to the main core laminations 12L when it would cause eddy current flow and generate heat. The leakage flux lines emerging from the outer periphery of the coil 16 follow many different paths in returning to the corresponding radial line at the inner periphery of the coil. One of the leakage flux "tubes" which often caused undesirable heating of the tank and core clamps of prior art transformers is the one which follows a completely external path in returning to the top and bottom core packs within the tongue. Such undesirable heating of the tank and core clamps is prevented by the present invention since the secondary leg laminations 25 and yoke laminations 26 return this portion of the leakage flux efficiently to its source in the bundles of laminations A-N in the tongue. Inasmuch as the secondary core leg laminations 25 and yoke laminations 26 are parallel to the main core laminations, the edges of the secondary core leg laminations 25 and yoke laminations 26 form surfaces R (see FIGS. 1 and 2) directly exposed to the leakage flux field external to the coil. After the leakage flux enters the secondary core leg laminations 25 and yoke laminations 26, the flux is readily conducted to the laminations of the bundles A–N which constitutes the tongue of the secondary core, since the flux need only cross the small air gap 29 along the path S shown in FIG. 2. The leakage flux return path from the outer diameter of coil 16 to the inner diameter thereof through the secondary core leg laminations 25 and yoke laminations 26 may necessitate that shields 31 comprising strip laminations 32 in vertical planes be affixed to the end walls 33 of tank 10 (see FIG. 2) and that similar shields 31 be affixed to the side walls 35 of the tank (see FIG. 1).

At normal voltage most of the exciting main flux is carried by the main core loops 14A and 14B and very little of the exciting flux is carried by the secondary core magnetic shield means because of the high reluctance of the air gap 29. FIG. 6 is a graph plotting flux density versus operating voltage of the transformer and shows that at rated voltage the flux density in the main core is approximately four times higher than that in the secondary core. As the transformer operating voltage increases, the magnetic flux density in the main core increases and its permeability decreases since it is operating near the knee of the hysteresis loop characteristic which is not linear in this region. The permeability of the air gap 29 in the secondary core remains constant at 1.0 at all magnetic flux densities, and consequently the reluctances of the primary and secondary cores approach equality as the transformer operating voltage increases. At high overvoltages the main core laminations saturate and the permeability of the iron decreases toward unity, which is the same value as that of the air in gap 29, and consequently the reluctance per unit area of the primary and secondary cores becomes approximately equal. FIG. 6 illustrates that the flux density in the secondary core increases with operating voltage and approaches that of the main core at approximately 120 percent of rated voltage. FIG. 6 also shows that the magnetic flux density in the main core, when no secondary core is provided, follows the dotted line curve and that saturation of the main core occurs at overvoltages less than 120 percent of rated voltage. In contrast, the secondary core carries a portion of the main flux at high overvoltages and, consequently, the maximum excitation level at which the main core saturates is increased approximately ten percent in comparison to a transformer without the secondary core magnetic shield of the invention.

Although the ability of the secondary core to shield the main core laminations diminishes when the flux density is increased in the secondary core as a result of transformer overexcitation, it will be appreciated that high leakage flux and overexcitation never occur simultaneously. High leakage flux is the result of high transformer current, and since overexcitation of a transformer is usually accompanied by relatively low transformer current, the problem of excessive eddy current overheating of the main core laminations due to leakage flux will never occur at a time when the shielding ability of the secondary core has been diminished.

FIG. 5 illustrates a three phase transformer embodying the invention. Three phase coils 40 (shown only in dotted lines) have aligned central openings. The main core may have two loops of magnetic material linking each phase coil 40 defined by outer leg laminations 41 extending the entire length of the main core; back-to-back tongue laminations 42 positioned between the outer leg laminations 41 and extending the entire length of the main core through the aligned central openings in the phase coils 40; yoke laminations 43 at the ends of the main core having miter joints at their ends with the outer leg laminations 41 and with the tongue laminations 42; and transverse laminations 45 having V-shaped ends which abut against complementary cutout portions in the outer leg laminations 41 and in the tongue laminations 42. It will be noted that the transverse laminations 45 are common to the two iron loops which link each of phase coils 40 between which said transverse laminations are positioned.

Identical secondary core magnetic shielding means are disposed at the upper and lower surfaces of the main core, and only the one disposed at the upper surface will be described. The upper secondary core magnetic shielding means includes a plurality of bundles, or core packs A–N of magnetic strip laminations disposed within the window of each phase coil 40 and extending axially beyond the ends of the phase coil and also comprises a closed loop of magnetic material surrounding each phase coil and separated by air gaps 29 from the ends of the bundles A–N of magnetic strip laminations which constitute the magnetic shield tongue. The secondary core closed loop surrounding the end phase coil 40A comprises a plurality of secondary core outer leg laminations 50 narrower than and disposed above the main core laminations 41; a plurality of secondary core yoke laminations 51 narrower than and disposed above the main core yoke laminations 43 and having straight line butt joints with the outer leg laminations 50 and being separated by an air gap 29 from one end of the bundles A–N of magnetic strip laminations which form the secondary core tongue; and a plurality of secondary core transverse laminations 52 narrower than and disposed above the main core transverse laminations 45 and having straight line butt joints with the secondary core outer leg laminations 51 and being separated by an air gap 29 from the other end of the packs A–N of magnetic strip laminations which form the secondary core tongue. It will be appreciated that the secondary core transverse laminations 52 are common to the secondary core shielding means associated with both the phase coils 40A and 40B and form portions of the iron return path for the leakage flux carried by the core packs A–N disposed within the central opening in both phase coils 40A and 40B. The core packs A–N of the three phase embodiment of FIG. 5 are substantially identical to those of the single phase embodiment and prevent penetration of a substantial magnitude of leakage flux into the main core tongue laminations 42.

FIG. 7 illustrates an embodiment of the invention wherein the laminations of the narrowest step of the main core are subdivided to further reduce eddy current heating caused by leakage flux. Vertical sheet insulation 61 is preferably disposed between the back-to-back loops 14A and 14B and horizontal sheet insulation 62 is preferably disposed between the main core and the core packs A–N. Sheet insulation 61 and 62 preferably have insulating blocks (not shown) mounted in spaced relation thereon to define cooling ducts for circulation of oil between the back-to-back loops 14A and 14B and between the main core and the secondary core defined by core packs A–N. Each of the narrowest steps of the cruciform main core may include a plurality of side-by-side auxiliary cores 63 and 64 in each core loop 14A and 14B separated by insulation 65 and comprising relatively narrow horizontal laminations 66, for example, laminations three inches wide. Eddy current wattage loss in a lamination is approximately proportional to the square of the dimension normal to the leakage flux, and since the laminations 66 are substantially narrower than the laminations in the narrowest step of the embodiment of FIGS. 1–6, it will be appreciated that this embodiment can withstand higher leakage flux without excessive overheating than the embodiment of FIGS. 1–6. Some magnetic flux penetrates the secondary core magnetic shield into the main core laminations, and the auxiliary cores such as 63 and 64 with relatively narrower laminations appreciably diminish the temperature rise in comparison to a transformer with wide laminations in the narrowest step of the cruciform winding leg.

FIGS. 8 through 10 illustrate an embodiment of the invention which omits the secondary core, magnetic shield packs A–N but utilizes the narrow lamination auxiliary core portions (such as core portions 63 and 64 of the FIG. 7 embodiment) in the narrowest step of the main core to reduce the temperature rise caused by eddy current heating. Four auxiliary cores 75, 76, 77, and 78 having relatively narrow horizontal laminations are provided in each of the narrowest step of the core illustrated in FIGS. 8–10, two auxiliary cores 75 and 76 being in the tongue portion of one closed rectangular loop 14A and two auxiliary cores 77 and 78 being in the tongue portion of the other closed loop 14B. Insulation 79 is provided between the auxiliary cores 75 and 76 and also between the auxiliary cores 77 and 78. The laminations of auxiliary core portions 75–78 have butt and lap joints in alternate lamination layers with yoke laminations of the rectangular loops 14A and 14B to form closed magnetic paths. FIGS. 9 and 10 illustrate the portions of alternate lamination layers at the junction between the narrowest step of the tongue and the yoke portion of the magnetic core. As shown in FIG. 9, the laminations of auxiliary core portions 75 and 76 in one layer may be shorter than the laminations of auxiliary core portions 77 and 78 and have a butt joint with a yoke lamination 80 of loop 14A, while one edge of the longer lamination of auxiliary core portion 78 may have a butt joint with yoke lamination 81 of loop 14B. In the succeeding lamination layer shown in FIG. 10, the laminations of auxiliary core portions 75 and 76 may be longer and overlap the corresponding butt joints in the layer shown in FIG. 9, while the shorter laminations of auxiliary core portions 77 and 78 may have a butt joint with a yoke lamination 83 in loop 14B which overlaps the butt joint occurring with yoke lamination 81 in the layer shown in FIG. 9. Assuming that the narrowest step laminations of a conventional core are 6 inches wide, use of auxiliary cores such as 75–78 having laminations only 3 inches wide will result in a temperature rise caused by eddy current overheating as a result of leakage flux which is only (3/6) squared, or one fourth that of the transformer with said laminations of 6 inch width. This embodiment is much more economical than that of FIGS. 1–6 and is particularly applicable to transformers of intermediate size, i.e., up to approximately 250 mva.

While only a few embodiments of the invention have been illustrated and described, many modifications and variations thereof will be readily apparent to those skilled in the art, and consequently it is intended that the appended claims cover all such modifications and variations which are within the true spirit and scope of the invention.

The embodiments of the invention in which an exclusive property or privilege is claimed are defined as follows:

1. An electrical transformer comprising a coil having a window therein, a closed magnetic core formed of a plurality of laminations of magnetic material extending through said window in said coil, and a magnetic shield loop having at least one air gap therein and extending through said window and formed of a plurality of laminations of magnetic material, the portion of said magnetic shield loop within said window comprising a plurality of bundles of strips of magnetic material parallel to the axis of said coil disposed between said core and the inner periphery of said coil, said bundles being disposed side-by-side and intersected by a common plane parallel to the plane of said core laminations and said strips of magnetic material being narrower than said core laminations, said magnetic shield loop normally carrying leakage flux and carrying a portion of the flux of said core when said transformer is overexcited.

2. An electrical transformer in accordance with claim 1 wherein said portion of said magnetic shield loop within said window includes a plurality of bundles of said strips of magnetic material certain of which are in planes perpendicular to said laminations of said magnetic core.

3. An electrical transformer in accordance with claim 2 wherein said closed magnetic core is defined by a pair of side-by-side loops and the abutting portions of said side-by-side loops form a winding leg which is encircled by said coil and wherein said plurality of bundles of strips of magnetic material are disposed between said winding leg and the inner periphery of said coil and extend beyond the axial ends of said coil and wherein said magnetic shield loop includes a closed member formed of a plurality of magnetic laminations encircling said coil and having opposed yoke portions each separated by an air gap from one end of said strips of magnetic material.

4. An electrical transformer in accordance with claim 3 wherein said winding leg has upper and lower surfaces and said magnetic shield loop has an upper plurality and a lower plurality of said bundles of strips of magnetic material positioned respectively between the inner periphery of said coil and said upper and lower surfaces of said winding leg and said magnetic shield loop also includes upper and lower of said closed members having said opposed yoke portions separated by an air gap from the ends of said upper and lower plurality of bundles of magnetic strips respectively.

5. An electrical transformer comprising, in combination,
first and second side-by-side closed cores each formed of a plurality of laminations of magnetic material, the abutting portions of said side-by-side cores defining a winding leg,
an electrical coil encircling said winding leg,
magnetic shielding means including a plurality of bundles of magnetic strip laminations extending through said coil between said winding leg and the inner periphery of said coil and extending axially beyond the ends of said coil, said magnetic shielding means also including a loop formed of a plurality of laminations of magnetic material encircling said coil and having opposed yoke portions each of which is separated by an air gap from one end of said magnetic strip laminations of said bundles,
said magnetic shielding means carrying leakage flux principally under normal excitation of said transformer and carrying a portion of the main core flux when said first and second cores become saturated under overvoltage conditions.

6. An electrical transformer in accordance with claim 5 wherein said winding leg has upper and lower surfaces and said magnetic shielding means includes a first and a second plurality of said bundles of magnetic strip laminations disposed respectively between the inner periphery of said coil and said upper and lower surfaces of said winding leg and also includes first and second of said loops having opposed yoke portions separated by an air gap from one end of said first and second plurality of bundles of magnetic strip laminations.

7. A transformer in accordance with claim 5 wherein certain of said magnetic strip laminations are in planes perpendicular to the laminations of said first and second closed cores.

8. A shell type electrical transformer comprising, in combination,
first and second side-by-side closed rectangular cores each formed of a plurality of laminations of magnetic material, the abutting portions of said first and second cores defining a winding leg having top and bottom surfaces,
an electrical coil including a plurality of pancake windings encircling said winding leg,
first and second magnetic shielding means extending through said pancake windings and each being a loop having at least one air gap therein formed of a plurality of laminations of magnetic material and including at least one bundle of said laminations positioned respectively between the inner periphery of said pancake windings and said top and bottom surfaces of said winding leg, said laminations of said first and second magnetic shielding means carrying leakage flux principally under normal operating conditions and carrying a portion of the main transformer flux when said magnetic core becomes saturated under overvoltage conditions.

9. A transformer in accordance with claim 8 wherein each said first and second magnetic shielding means comprises a plurality of bundles of magnetic strip laminations positioned between the inner periphery of said pancake windings and said winding leg and certain of which are in planes perpendicular to said laminations of said closed cores and extend beyond both axial ends of said coil and are separated at both said axial ends by an air gap from said laminations of said magnetic shielding means external to said coil defining the flux return path of said loop.

10. A shell type electrical transformer comprising, in combination,
   first and second side-by-side closed rectangular cores each formed of a plurality of laminations of magnetic material and having opposed legs and opposed yokes, the side-by-side legs of said first and second cores forming a winding leg having top and bottom surfaces,
   an electrical coil including a plurality of pancake windings encircling said winding leg,
   first and second magnetic shielding means disposed respectively between the inner periphery of said coil and said top and bottom surfaces of said winding leg and each comprising a plurality of bundles of magnetic strip laminations extending beyond the axial ends of said coil, each said first and second magnetic shielding means also including a rectangular loop formed of a plurality of laminations of magnetic material and having opposed leg portions disposed adjacent the outer legs of said first and second cores connected by opposed yoke portions disposed adjacent said yokes of said first and second cores and being separated by air gaps from the ends of said bundles of magnetic strip laminations extending through said coil,
   said bundles of laminations principally carrying leakage flux under normal operating conditions and carrying a portion of the main transformer flux when said cores become saturated under overvoltage conditions on said transformer.

11. A shell type transformer in accordance with claim 10 wherein said laminations of certain of said bundles are in planes perpendicular to said laminations of said first and second cores.

12. A shell type transformer in accordance with claim 11 wherein said winding leg is of cruciform cross section and the narrowest steps of said winding leg each include a plurality of spaced apart auxiliary core portions in each said closed rectangular core comprised of laminations parallel to and narrower than said laminations of said legs of said closed rectangular core and having their ends adjacent said yokes to provide magnetic return paths through said closed rectangular cores.

13. A shell type electrical transformer comprising, in combination, first and second side-by-side closed rectangular cores each formed of a plurality of laminations of magnetic material in horizontal planes and having opposed legs and opposed yokes, said laminations being of different widths and the side-by-side legs of said first and second cores forming a winding leg of approximately cruciform cross section having top and bottom surfaces,
   an electrical coil including a plurality of circular pancake windings encircling said winding leg,
   first and second secondary core magnetic shielding means each including a plurality of bundles of magnetic strip laminations disposed respectively between the inner periphery of said coil and said top and bottom surfaces of said winding leg and extending beyond the axial ends of said coil and certain of said magnetic strip laminations being in vertical planes, each of said first and second secondary core magnetic shielding means also including a rectangular loop formed of a plurality of laminations of magnetic material in horizontal planes having opposed leg portions disposed adjacent the outer legs of said first and second closed cores and opposed yoke portions disposed adjacent said yokes of said first and second closed cores and being separated by air gaps from the ends of said bundles of magnetic strip laminations extending through said coil,
   said bundles of magnetic strip laminations carrying leakage flux principally under normal excitation of said transformer and carrying a portion of the main transformer flux as said first and second cores saturate when said transformer is overexcited.

14. A shell type transformer in accordance with claim 13 wherein said bundles of magnetic strip laminations of each of said first and second magnetic shielding means are disposed side by side in a horizontal plane and vary in height in a vertical direction so that they conform to the circular inner periphery of said pancake windings.

15. A transformer in accordance with claim 14 wherein the cross sectional areas of said bundles are selected to prevent temperature rise of the narrowest step laminations of said cruciform cross section winding leg from exceeding 80° C. as a result of eddy current heating caused by leakage flux when said electrical coil is carrying rated current.

16. A three phase shell type transformer comprising, in combination,
   three electrical phase windings each having a central opening therein spaced from each other and having said central openings in alignment,
   magnetic core means comprising a plurality of laminations of magnetic material forming two closed loops associated wtih each phase winding passing through said central opening,
   magnetic shielding means including a plurality of bundles of magnetic strip laminations associated with each phase winding positioned between said magnetic core means and the inner periphery of said coil defining said central opening and extending beyond the axial ends of said phase winding and also including a loop formed of laminations of magnetic material encircling said phase winding and having opposed yoke portions separated by air gaps from the ends of said magnetic strip laminations,
   said magnetic shielding means carrying leakage flux principally under normal excitation of said transformer and carrying a portion of the main transformer flux when said laminations of said magnetic core means saturate under overvoltage conditions.

17. A transformer in accordance with claim 16 wherein said yoke portions between adjacent phase windings are common to the magnetic shield loops of both said phase windings.

18. An electrical transformer comprising a coil having a window therein, a closed magnetic core having a winding leg portion formed of a plurality of laminations of magnetic material in planes parallel to the coil axis extending through said window and yoke portions adjacent the axial ends of said coil, said laminations extending the entire width of said winding leg portion, a magnetic shield loop extending through said window and disposed between the inner periphery of said coil defining said window and the planar surfaces of the laminations of said winding leg portion, the portion of said magnetic shield loop within said window comprising a plurality of auxiliary core portions disposed side-by-side in a common plane parallel to the planes of said laminations and each said auxiliary core portion including a plurality of magnetic strips in planes parallel to said planes of said magnetic core laminations and being narrower than said winding leg laminations and having joints at their ends with laminations of said yoke portions and a magnetic return path through said yoke portions, said plurality of side-by-side auxiliary core portions lying directly above the planar surface and between the side edges of said winding leg laminations.

19. An electrical transformer in accordance with claim 18 wherein said closed core is a rectangular loop and said transformer has a pair of said rectangular loop, closed cores with said winding leg portions back-to-back extending through said coil window, and including a pair of said magnetic shield loops each including said side-by-side auxiliary core portions extending through said window and disposed between the inner periphery of said coil and the planar surfaces of said core laminations at the upper and lower ends of the winding leg portion of each of said closed cores.

20. An electrical transformer in accordance with claim 19 wherein said transformer is of the shell type and said coil window is circular and said winding leg portion is of semicruciform cross section and said back-to-back winding leg portions define a cruciform-in-cross section core tongue extending through said circular window and the narrowest steps of said cruciform cross section are comprised of a plurality of said side-by-side auxiliary core portions in each said closed core and the width of said magnetic strips is only a minor fraction of the width of said laminations of the winding leg portion of each said closed core.

References Cited
UNITED STATES PATENTS

| | | | |
|---|---|---|---|
| 1,424,259 | 8/1922 | Peters | 336—212 XR |
| 2,483,159 | 9/1949 | Somerville | 336—212 XR |
| 2,908,880 | 10/1959 | Steinmayer et al. | 336—212 XR |
| 3,170,133 | 2/1965 | Kernick | 336—211 XR |

FOREIGN PATENTS 1,015,044  12/1965  Great Britain.

LEWIS H. MYERS, Primary Examiner

T. J. KOZMA, Assistant Examiner

U.S. Cl. X.R.

336—84, 178, 212, 234